United States Patent [19]

Spiller

[11] Patent Number: 4,950,489

[45] Date of Patent: Aug. 21, 1990

[54] PREPARATION OF DRIED FORMS OF LEAVENING BARMS CONTAINING AN ADMIXTURE OF CERTAIN LACTOBACILLUS AND SACCHAROMYCES SPECIES

[75] Inventor: Monica A. Spiller, Los Altos, Calif.

[73] Assignee: Alton Spiller, Inc., Los Altos, Calif.

[21] Appl. No.: 304,131

[22] Filed: Jan. 31, 1989

Related U.S. Application Data

[63] Continuation-in-part of Ser. No. 187,163, Apr. 28, 1988, abandoned.

[51] Int. Cl.$^5$ .................... A21D 2/36; A21D 8/04; A23L 1/105
[52] U.S. Cl. .................... 426/18; 426/61; 426/62; 426/19; 426/27; 435/42; 435/255; 435/252.4
[58] Field of Search .................. 126/18, 21, 61, 62, 126/27; 435/42, 253, 255

[56] References Cited

U.S. PATENT DOCUMENTS

| | | |
|---|---|---|
| 2,919,194 | 12/1959 | Johnston . |
| 3,510,312 | 5/1970 | Rupprecht et al. . |
| 3,734,743 | 5/1973 | Kline . |
| 3,891,773 | 6/1975 | Kline . |
| 3,963,835 | 6/1976 | Gryczka . |
| 4,243,687 | 6/1981 | Kline . |
| 4,666,719 | 5/1987 | Spiller . |

OTHER PUBLICATIONS

Yarrow, "Genus 22 Saccharomyces Meyen ex Reess" in *The Yeasts*, Kreger-van Rij ed. Elsevier, 1984, pp. 379–395.

Kandler et al., "Regular, Nonsporing Gram-Positive Rods" in *Berquey's Manual of Systematic Bacteriology* II, 1986, 1208–1234.

Faridi, "Flat Breads" in *Wheat: Chemistry and Technology* II, 1988, pp. 457–506.

Oura et al., "Sour Doughs" in *Fermented Foods* 1982, Academic Press, pp. 123–146.

Kouhestani et al., 1969 Journal of the American Dietetic Assoc., 55:262–266.

Tadayon, 1976 J. Milk Food Tech., 39(8):539–542.

Tadayan, 1978 J. of Food Preparation, 41(9):717–721.

Reed et al. in *Yeast Technology*, 1973 AVI Publishing, pp. 90–102 and 139–147.

van Dam, "The Biotechnology of Bakers's Yeast" in *Chemistry and Physics of Baking* (Blanshard et al., 1986, pp. 117–131.

*Primary Examiner*—Marianne Cintins
*Attorney, Agent, or Firm*—Irell & Manella

[57] ABSTRACT

A dried granular form of a whole grain leavening barm containing viable cells of a maltosa-fermenting Lactobacillus and viable cells of a non-maltose-fermenting Saccharomyces has now been produced. The product of the drying process in preferred embodiments contains an admixture of *Saccharomyces dairensis* (ATCC 20782) and *Lactobacillus brevis* (ATCC 53295), whole grain flour, nonvolatile products of fermentation, and 5–12% water. Soybean oil containing the emulsifying agent lecithin and antioxidant tocopherols and malted whole grain flour are optional additives. The process of drying provided by this invention employs whole grain flour as a partial drying agent and also employs a sequential method for drying in which the microorganisms are supported on flour in the form of granules for the final warm air-drying stage.

26 Claims, No Drawings

PREPARATION OF DRIED FORMS OF LEAVENING BARMS CONTAINING AN ADMIXTURE OF CERTAIN LACTOBACILLUS AND SACCHAROMYCES SPECIES

This is a continuation-in-part of U.S. patent application Ser. No. 187,163, filed Apr. 28, 1988, now abandoned.

BACKGROUND OF THE INVENTION

1. Field of the Invention

This invention concerns partially dehydrated natural leavening barms. More particularly, it concerns those leavening barms which contain a non-maltose-fermenting *Saccharomyces* species and a maltose-fermenting *Lactobacillus* species as the majority microorganisms. These microorganisms are admixed with whole grain flour, most usually rye or wheat flour and water. The microorganisms in these barms are optionally further stabilized in the dried product by the inclusion of malted whole grain flour, an emulsifying agent and an antioxidant; the latter two both being obtained conveniently from soybean oil. These barms can bring about fermentation and natural leavening in breads and like baked goods. In addition, this invention relates to the method for producing these leavening barms in a granulated dried form and their use in a dried form for producing breads.

2. Description of Background Art

Some traditional leavening agents for breadmaking which are made from the grains wheat, rye, barley and oats and which may still be in use, are perpetuated by refreshing a portion of the leavening agent with flour, water and various other ingredients at intervals, between baking times. Usually these traditional leavening agents are not produced in a dried form for storage but instead must be continually refreshed to maintain the supply or restarted, with the risk that a useful culture may not be produced again. An exception to this may be the manner in which a sourdough leavening is dried in Finland. This is described by Oura, 1982, where he states that "A traditional way of preserving rye sourdough in Finland has involved the natural drying of the dough on the surface of wooden containers (Oura et al., "Breadmaking" in *Fermented Foods*, Rose ed., 1982, Academic Press, p. 134). From a practical point of view, there is an art to the drying process if the sourdough is to be rehydrated to an exactly similar sourdough, and that art is not described in the literature as far as can be ascertained at this time.

The microorganisms in several of these traditional leavening agents and one recently discovered leavening agent, have now been described (Oura et al., supra; Kouhestani et al., "Composition and Preparation of Iranian Breads," in *Journal of the American Dietetic Association* (1969) 55:262-266; U.S. Pat. No. 4,666,719) and a pattern is recognizable. The pattern of the microflora in the leavening agents of interest here is that they contain a *Saccharomyces* yeast species which does not ferment maltose together with a *Lactobacillus* species that does ferment maltose. The *Saccharomyces* yeast and the *Lactobacillus* are probably symbiotic and each will allow the other to grow well in the dough. These are the most usual majority microorganisms present but there are often minor amounts of other yeasts and bacteria which determine the more subtle characteristics of a particular leavening agent. Other yeast genera which have been recognized in continuous traditional leavening agents include *Pichia* and *Hansenula*. Other bacterial types which have been found in continuous leavening agents include *Leuconostoc, Streptococcus* and *Pediococcus*.

A currently accepted taxonomic classification of the *Saccharomyces* genus of yeasts (Yarrow, "Genus 22, *Saccharomyces* Meyen ex Reess," in *The Yeasts*. Kreger-van Rij ed. (1984), Elsevier Science Publishers BV, Amsterdam, pp. 379-395) includes seven species. There are three *Saccharomyces* yeasts that do not usually ferment maltose and which have been definitely recognized as useful in leavening agents; these are *S. exiquus, S. telluris,* and *S. dairensis*. *S. exiquus* is present in the San Francisco sourdough leavening where it grows symbiotically with *Lactobacillus sanfrancisco* (Oura, supra, p. 130) and also in Italian panettone dough (Oura, supra, p. 131) where it is found growing with *Lactobacillus brevis* and *Lactobacillus plantarum*. All these *Lactobacillus* species ferment maltose. *S. exiquus* has also been isolated from traditional Iranian bread dough (Tadayon, "Identification of Yeasts Isolated from Bread Dough of Bakeries in Shiraz, Iran," in *Journal of Food Protection* (1978) 41:9, pp. 717-721) in a study that was not concerned with any *Lactobacillus* species that might also have been present, so its symbiotic pairing there is not yet known.

*S. telluris* has been found in traditional bread doughs in Iran (Tadayon, supra) but without reference to a symbiotic pairing with a Lactobacillus species.

*S. dairensis* has been found in both wheat and rye leavening barms prepared from microorganisms to be found naturally occurring on the wheat or rye grain. In the wheat leavening barm *S. dairensis* appears to be growing symbiotically with an atypical strain of *Lactobacillus brevis* which nevertheless does ferment maltose (U.S. Pat. No. 4,666,719).

*S. servazzii* and *S. unisporus* are not mentioned yet in the literature as species useful for breadmaking even though they do not normally ferment maltose and would apparently be suitable for symbiotic pairing with a maltose-fermenting *Lactobacillus* species in a leavening agent. It is reasonable to expect that they will eventually either be used for breadmaking in conjunction with *Lactobacillus* species or they will be found to be present in some traditional bread leavening agents.

*S. cerevisiae* and *S. kluyveri* can usually ferment maltose and are not therefore suitable for symbiotic pairing with a *Lactobacillus* species which also ferments maltose. *S. cerevisiae* strains are used as modern bakers' yeast and *S. kluyveri* has been found in traditional leavening agents used to make bread in Iran (Tadayon (1978), supra). Breads made with either of these two yeasts would not be expected to have the characteristic flavor or self-preservative properties associated with the acids produced by symbiotic *Lactobacillus* bacteria present in the leavening agent.

The *Lactobacillus* species most usually found in sourdough leavening systems are *L. plantarum, L. brevis,* and *L. fermentum* (Oura, supra. p. 128). Other *Lactobacillus* listed in the most recent edition of *Bergey's Manual* (Kandler & Weiss, "Regular Nonsporing Gram-Positive Rods," in *Bergey's Manual of Systematic Bacteriology*," Vol. II, ed. Holt, Williams & Wilkins, Baltimore (1986), pp. 1208-1234) which have been isolated from sourdoughs are: *L. farciminis, L. alimentarius, L. casei* and *L. sanfrancisco*. Each of these species of *Lactobacillus* could be expected to be found growing symbiotically with one of the non-maltose fermenting *Saccharomyces* yeast. The specific pair that would grow naturally in a certain flour-and-water system would be determined by the nutrients to be found there. Examples of other leavening agents containing *Lactobacillus* species include those used to make German rye breads, and Egyptian and Iranian wheat breads (Oura, supra, p. 126; Faridi, "Flat Breads," in *Wheat: Chemistry and Technology*, Vol. II, ed. Pomeranz, 1988, American Association of Cereal Chemists, St. Paul, Minn., p. 479).

Isolation of the majority microorganisms only, and their subsequent perpetuation and use to inoculate a bread dough, may not produce the same characteristics obtainable from the original leavening agent. In order to preserve all the microorganisms that give the full character to traditional leavening agents and to make these traditional leavening agents more generally available, it would be useful to be able to prepare them economically in a storage-stable, dried, granular form, and then to be able to reproduce the original leavening agent easily from this form. Initial work showed that the seemingly obvious method of directly drying a mature leavening agent in the form of an extruded dough was uneconomical in energy use and in any case the microorganisms did not survive the process well.

Traditional leavening agents have been propagated through the centuries or restarted using ancient techniques, and until the nineteenth century, most likely with similarly grown and milled flour and a similar water supply.

Before the invention of roller milling in the nineteenth century a refined flour meant a finely ground flour containing parts, and therefore nutrients, from the whole grain. With the use of roller milling, a refined flour can be made which contains only the endosperm of the grain and practically none of the nutrients to be found in the germ and bran of the whole grain. The reduced number of nutrients present in modern roller-milled, refined flour is partially compensated for with added vitamins and minerals, to an extent that is varied from one country to another.

The grain variety selected for producing a modern flour may also be changing with time. Reasons for this are the development of new grain varieties and trading practices that result in the use of introduced varieties of grains from different areas of the world. A modern miller is likely to blend a series of different grain varieties, from several sources, into the flour which is finally sold.

Modern growth, storage and distribution condition for grains are almost certain to include the use of pesticides or a physical treatment to prevent insect or microbial contamination. Unfortunately, this same treatment probably also results in a loss of the microorganisms from which a traditional natural leavening could be made.

Before the use of roller milling, the finely ground flours were essentially whole grain flours which could not be stored for long periods without becoming rancid or being damaged by insects or moulds. Instead, the grains were stored whole and in general were milled only when they were about to be used for breadmaking. With this practice there was the additional advantage that those nutrients which might have been lost during even a short storage time were still available for the leavening microorganisms, as well as for those people eating the resulting bread.

The use of malted grains in bread doughs is a modern as well as an ancient practice. Malted grains add vitamins to the leavening or dough and enzymes that have a variety of activities including the improvement of the bread texture, the release of maltose from flour, and the breakdown of phytic acid and the resultant release of bound minerals for digestion. This activity provided by malted grains is due to the sprouting of the grain which is the second stage in the malting process following soaking in water. Subsequent processing during malting involves drying under conditions that determine the final malt properties; some enzymes are easily destroyed by heat while the malt is dried. In ancient times sprouting could have occurred while grains were being soaked in an attempt to soften them before making a dough, or the grains could have sprouted even before they were harvested, in rainy harvest seasons, and then been dried again while still in the ear of the grain. In other words, traditional leavening agents are most likely best supplemented with a simple malt rather than a refined sugar when it is desired to boost the growth of the leavening microorganisms.

The water available now for breadmaking is quite likely to have been treated with bacteriostatic chemicals. This is invaluable for preventing the spread of disease-causing microorganisms. However, if these chemicals remain in the water that is to be used for traditional breadmaking, then the proliferation of the natural leavening microorganisms may be impaired.

All of this is to say that in order to successfully produce and propagate a particular traditional leavening agent, it is necessary to use the whole grain flour from a particular variety of the grain, some of which has been sprouted or malted, and which has not been treated physically or with pesticides so as to destroy residual microorganisms and yet is nevertheless clean and undamaged, and to use a good drinking water that does not contain residual bacteriostatic chemicals. A leavening agent produced with these criteria is most likely to contain robustly growing microorganisms. Such a system would give the best leavening and would also have the best chance of surviving further processing such as drying for prolonged storage stability.

When all these criteria are met and the leavening agent is seen to contain a non-maltose-fermenting *Saccharomyces* species and maltose-fermenting *Lactobacillus* species as the majority leavening microorganisms, then perhaps this leavening could be classified as a "barm". In this way it would be distinguishable from sourdough starters which are often made with refined flours and sugars and are frequently used only to produce an acidic dough which is then leavened with *S. cerevisiae* in the form of bakers' yeast. A barm would be expected to produce a well-acidified dough and the corresponding characteristics in the finished bread. A sourdough leavened with bakers' yeast might produce only a partially acidified dough since the yeast would most likely ferment the same sugars as the acidifying bacteria, and so prevent their full proliferation.

The desirability of producing leavening barms is partly due to the concept of continuing an ancient art successfully, but more important are the properties of the whole grain breads produced. The acidic doughs of barm breads result in good flavor for the finished bread, self-preservation against the growth of molds, and enhanced availability for digestion, even over the effect of malted grain or simple bakers' yeast fermentation, of the minerals naturally present in the whole grain flours (Faridi, supra, p. 496).

A particular leavening barm containing the symbiotic microorganisms, *Saccharomyces dairensis* and *Lactobacillus brevis*, admixed with water and whole grain flour in the form of a slurry, paste or dough is now known and is described in U.S. Pat. No. 4,666,719 of Spiller. This barm has a limited storage life. When this barm is held at about 4° C., it remains useful as a leavening agent for about two months after preparation. At room temperature, the barm has a shorter shelf life—on the order of several days. While this barm is quite useful, it would be advantageous to have the barm in a form which would permit it to be distributed and stored for long periods without the cost and inconvenience of refrigeration. This would make the barm potentially more universally available. This invention provides for barms such as this in a dried or granulated form.

Economically feasible methods for producing dry baker's yeast and dried bacterial cultures separately are known, but methods for economically drying symbiotic yeast and bacterial pairs in the presence of whole grain flour are not known to be in use. Baker's yeast (*Saccharomyces cerevisiae*) strains have been available in dry forms stable at room temperature, since the 1920's. Some bacteria are also generally associated with dried forms of baker's yeast but they are neither intended nor expected to multiply appreciably in the dough as part of a desirable fermentation.

References to the production, stability and use of dried forms of baker's yeast are made in Reed & Peppler, *Yeast Technology*, 1973, AVI Publishing Co., Westport, Conn., pp. 90–102, 139–147; and by van Dam, "The Biotechnology of Baker's Yeast", in *Chemistry & Physics of Baking* ed. Blanshard et al., 1986, Royal Society of Chemistry, London, pp. 117–131. These references are believed to well summarize the state of the art. The most usual active dry yeast has a moisture content of between 7.5% and 8.3% and can remain viable at ambient temperatures for a year if it is stored under nitrogen or vacuum. Over that period only about 10% of its activity is lost. Its particular stability is due to factors such as its low moisture content, the addition of emulsifiers, antioxidants and soybean oil in some cases and to the selection of specific strains of *Saccharomyces cerevisiae* that survive the dehydration process well. However, the water used for the rehydration of active dry yeast for breadmaking must be at 40° C. to avoid excessive leaching of the yeast cell contents and subsequent loss of leavening activity and damage to the gluten. When the moisture content of baker's yeast is below 7.5%, water vapor rehydration is necessary to prevent loss of leavening activity.

Two patent references are of particular interest because use is made of flour in producing dried forms of bacteria and yeast. One is U.S. Pat. No. 4,243,687 issued to Kline, for the preparation of a freeze-dried natural sourdough starter. Flour forms part of the supporting medium on which the starter is freeze-dried but the conditions do not allow the symbiotic yeast in the starter to survive the drying process. The end product is a dried form of *Lactobacillus sanfrancisco* in a mixture containing a refined wheat flour. U.S. Pat. No. 3,510,312 issued to Rupprecht and Popp is also of importance here, since it is concerned with the drying and resultant stabilization of baker's yeast with various pre-dried flours. A final moisture content of 11–15% in the baker's yeast mixture is achieved in this process, and provides a mixture which can be used satisfactorily for baking after several months storage at room temperature.

Johnston in U.S. Pat. No. 2,919,194, describes a method for suspending compressed yeast in oil and performing the dehydration while the yeast is in contact with the oil. The excess oil is removed at the end of the drying process and the dried yeast produced still contains 5–10% oil unless it is removed with a solvent. The presence of a wetting agent such as lecithin is recommended as advantageous by Johnston as is the presence of a yeast fermentable saccharide. (The corn oil used by Johnston may have been a less refined oil, and thus contained significant amounts of lecithin, since he makes no mention of using a refined corn oil.) It is also important to note that Johnston recommended prior propagation of the yeast in a medium somewhat reduced in phosphorus and nitrogen. This dehydration method has the reputation of producing a very stable and effective dried yeast, but the process was found to be too expensive to bring into general use. However, instant dried yeasts are today being produced that are admixed with polyglycerol esters of fatty acids, potato starch and soy bean oil which is also an oil known to contain significant amounts of the emulsifying agent lecithin, as well as antioxidant tocopherols, provided it has not been refined.

REFERENCES CITED

The following is a summary of the references noted in this Background and several additional references of interest to the present invention.

| A. | U.S. Pat. Documents | | | |
|---|---|---|---|---|
| | 2,919,194 | 12/59 | Johnston | 99-96 |
| | 3,510,312 | 5/70 | Rupprecht | 99-94 |
| | 4,243,687 | 1/81 | Kline | 426/62 |
| | 4,666,719 | 5/87 | Spiller | 426/18 |

B. Other Publications

1. Reed & Peppler, *Yeast Technology*, 1973, AVI Publishing Co., Westport, Conn., pp. 90–102, 9–147.
2. van Dam, "The Biotechnology of Baker's Yeast," in *Chemistry & Physics of Baking*, ed. Blanshard et al., 1986, Royal Society of Chemistry, London, pp. 117–131.
3. Yarrow, "Genus 22, *Saccharomyces* Meyen ex Reess," in *The Yeasts*. ed. Kreger-van Rij, 1984, Elsevier Science Publishers BV, Amsterdam, pp. 379–395.
4. Kandler & Weiss, "Regular Nonsporing Gram-Positive Rods," in *Bergey's Manual of Systematic Bacteriology*, Vol. II, ed. Holt, 1986, Williams & Wilkins, Baltimore, pp. 1208–1234.
5. Faridi, "Flat Breads," in *Wheat: Chemistry and Technology*, Vol. II, ed. Pomeranz, 1988, American Association of Cereal Chemists, St. Paul, pp. 7–506.
6. Oura, Suomalainen & Viskari, "Breadmaking," in *Fermented Foods*, ed. Rose, 1982, Academic Press Inc., Orlando, pp. 123–146.
7. Kouhestani et al., "Composition and Preparation of Iranian Breads," in *Journal of the American Dietetic Association*. Vol. 55, Sept. 1969, pp. 262–266.
8. Tadayon, "Characteristics of Yeasts Isolated from Bread Doughs of Bakeries in Shiraz, Iran", in *Journal of Milk Food Technology*, Vol. 39, Aug. 1976, pp. 539–542.
9. Tadayon, "Identification of Yeasts isolated from Bread Dough of Bakeries in Shiraz, Iran," in *Journal of Food Protection*, Vol. 41, No. 9, Sept. 1978, pp 717-721.

STATEMENT OF THE INVENTION

Dried particulate powdered (or granular) forms of whole grain leavening barms containing maltose-fermenting *Lactobacillus* species and non-maltose-fermenting *Saccharomyces* species have now been produced. The essential product of the drying process contains an admixture of viable cells of non-maltose-fermenting *Saccharomyces* species and viable cells of maltose-fermenting *Lactobacillus* species, whole grain flour, nonvolatile products of fermentation and a moisture level low enough to permit nonrefrigerated preservation for a year, such as 5-12% by weight water. A vegetable oil containing the emulsifying agent lecithin and antioxidant tocopherols may be added if desired, as well as malted whole grain flour. In preferred embodiments, the whole grain flour is a whole wheat or whole rye flour, the lecithin and tocopherols are supplied by soybean oil, and the malted whole grain flour is a diastatic malted wheat or rye flour.

The present invention employs a combination of non-maltose-fermenting *Saccharomyces* yeast and maltose-fermenting *Lactobacillus* bacteria which are symbiotic, such that they can coexist as viable organisms in one dried product, and both of which flourish in and are useful in a final whole grain (wheat or rye) bread product. The process of drying provided by this invention employs a whole grain flour as a partial drying agent and also employs a sequential method for drying that includes a stage where the microorganisms are supported on whole grain flour in the form of granules once the water content has been reduced to 25-40% for the final drying stage, so as to reduce the amount of energy that might otherwise be required and to permit the gradual adaptation of the microorganisms to the relatively dry state. The drying process and subsequent rehydration results in a barm with leavening action indistinguishable from the initial barm that has not been subjected to the drying process.

DETAILED DESCRIPTION OF THE INVENTION

The Leavening Barm

Representative starting materials for use in this invention can be prepared as described in U.S. Pat. No. 4,666,719, which is incorporated herein by reference. This material may be prepared prior to use in this drying process and stored under refrigeration, if desired Leavening barms produced in this way from wheat and rye contain approximately $10^6$–$10^8$ live cells of a non-maltose-fermenting *Saccharomyces* yeast and $10^8$–$10^{10}$ live, maltose-fermenting *Lactobacillus* bacteria per gram of barm. *Saccharomyces* species which fit this definition include *S. dairensis, S. exiquus, S. telluris. S. servazzii,* and *S. unisporus.* Of these, *S. dairensis* is preferred. *Lactobacillus* species which fit this definition include *L. brevis, L. plantarum, L. fermentum. L. farciminis, L. alimentarius, L. casei,* and *L. sanfrancisco.* Of these, *L. brevis* is preferred. Since use is made of certain microorganisms normally present on whole grains for the preparation of these leavening barms, it is often advantageous to prepare whole grain flour, sprouted grain and malt from grain that has been grown and stored without the use of chemical or physical (pesticidal) treatment, and is nevertheless clean and undamaged. For the same reason, water used to make a leavening barm should be free from bacteriostatic chemicals. The water also may supply some minerals to the barm microorganisms; a normally mineralized good drinking water is suitable for the preparation of a leavening barm.

Other traditional leavening barms can also be dried by the process described here, provided they have been propagated using whole grain flour, sprouted grain or malt all from undamaged whole grain, and water as described above, and have consistent properties from one refreshment to the next.

The incorporation of sprouted grains or malt in propagated leavening barms is advantageous to the vigorous growth of the barm microorganisms although good growth can still occur when they are excluded.

A suitable water content for the leavening barm that is to be dried is from 45% to 60%.

Drying the Leavening Barm

The drying process of this invention is a multistep process. The water content of the above-described leavening barm is gradually (continuously or stepwise) reduced by adding controlled amounts of whole grain flour and water to yield an overall water content of 20-35%. This reduced water content product is granulated and then dried with warm air to a final water content of less than 12% and usually between 5 and 8% by weight. Malted whole grain flour, and/or an emulsifying agent and an antioxidant from a vegetable oil may also be present during the drying process but are not essential. Preferably the whole grain flour is whole wheat flour or rye flour, and the malted flour is malted whole wheat or malted whole rye. Whole grain flours naturally contain some tocopherols, but the addition of extra tocopherols from soybean oil reduces the damage to the microorganisms due to oxygen during prolonged storage under air. Under the initial conditions the yeast is propagated in a fully hydrated state. When malted whole grain flour is present the fermentation takes place in the presence of more fermentable saccharide than is found in unmalted whole grain flour and in the presence of altered phosphorus and nitrogen components from the malted flour, compared to the whole grain flour alone. This is believed to enhance the ability of the propagated yeast to withstand the drying process. Lecithin also contributes bound phosphorous and acts as an emulsifying agent to protect the yeast cell walls during dehydration and subsequent rehydration. Diastatic malted whole grain flour, lecithin and tocopherols are advantageous in bread recipes, and in any case relatively small amounts would be introduced with the finally dried barm. The malted whole grain flour contributes to the flavor, color and texture, and the lecithin and tocopherols contribute primarily to the texture of the breads produced.

In one embodiment of this process the original starting barm is first refreshed with whole grain flour and water to a water content of about 60% and allowed to grow out under favorable yeast and bacterial growth conditions, such as a temperature of from about 18° C. to about 37° C., in the presence of optionally added malted whole grain flour and soybean oil containing tocopherols and lecithin. Fermentation of this 60% hydrated mixture is allowed to proceed to a point at which the concentration of viable yeast and bacterial cells is the same as in the starting barm, that is, $10^{6-8}$ live yeast cells and $10^{8-10}$ live bacteria per gram. This can generally take up to about 24 hours. The time taken for the number of yeast cells to double is from about 2–8 hours or more according to the temperature.

The water content of the propagated barm is then gradually reduced by adding whole grain flour together with water in decreasing proportion and optionally, malted whole grain flour and soybean oil containing lecithin and tocopherols. This method of water content reduction is carried out to a water content of 20–35% by weight.

In one embodiment the addition of whole grain flour and optional ingredients is conducted continuously with mixing. In another embodiment the addition of the drying materials is stepwise. In the stepwise process, each of the steps should involve adding up to about 100% by weight, based on the amount of wet barm being mixed, of dry flour and optional ingredients. The rate of continuous addition or the period between stepwise additions is controlled so as to give the barm microorganisms a chance to continue to grow out. The rate of continuous addition or space between stepwise additions should be controlled so as to permit the achievement of viable yeast and bacterial cell concentrations equal to those concentrations in the starting barm, in each case.

While on a commercial scale, a continuous addition process may prove most advantageous, good results can be achieved with two to five stepwise reductions in the water content of the barm by the addition of whole grain flour and progressively less water and optionally the addition of malted whole grain flour and soybean oil containing lecithin and tocopherols.

In cases where the water content of the starting barm was increased up to about 60%, the first stepwise addition of flour generally reduces the water content to about 50%. The next addition reduces the water content to about 40% and the next to about 30%, e.g., 20 to 35% by weight. After each of these additions, the microorganisms in the mixture are allowed to grow out so as to achieve similar or the same microorganism densities as noted in the starting barm. Typically chosen grow out times are 4 to 24 hours.

At the 40% moisture content the mixture is essentially a stiff dough which can be converted to coarse granules and at the 30% moisture content the mixture can be converted into fine granule using a food processor equipped with a rotating blade mixer. Granules are produced in a few seconds from the dough and enough flour to reduce the moisture content to 40% and 30% respectively. The subsequent air-drying process reduces the moisture content from 30% to below 12% and usually between 5 and 8%.

In a preferred embodiment, a further amount of flour is added with mixing, such as with a food processor, to bring the moisture content from the 30% level to about 28%. This addition of whole grain flour and optionally malted whole grain flour is done to supply the microorganisms with fresh nutrients during the drying process as well as during the rehydration process. If this optional addition is carried out it is generally desirable to do it less than 24 hours but preferably less than 8 hours before the final drying stage. This final drying stage is effected in the presence of warm dry air (65° C. maximum). The temperature of the barm granules remains well below 65° C. and their temperature rises slowly as the water is driven off. The barm granules are stirred during drying. This can be done continuously or at intervals. This final drying stage takes 2–16 hours according to the extent of the air flow and the chosen drying-air temperature. The product is free-flowing and it can be packed under vacuum or air and stored at ambient room temperatures without significant deterioration at least for 1 month and up to at least 1 year, if it is stored at cool temperatures in a sealed package possessing low oxygen and moisture transmission properties.

Thus, the invention provides a process of propagating leavening barm microorganisms, optionally at about 60% water content, and then at a plurality of water contents such as about 50%, at about 40%, and at about 30% and then drying the resulting product with dry air to a 5–12% water content in the presence of whole grain flour.

Rehydration of the Dried Barm

To rehydrate the dried barm, it is mixed with enough water to produce a soft dough or batter. This mixture is allowed to stand at conditions suitable for reactivating the organisms. 18–43° C. is a typical temperature for this. It is advantageous to wait for a period such as up to about 24 hours under these grow out conditions before using the rehydrated barm in a recipe so that both of the symbiotic microorganisms can multiply and the mixture can reach an acidic pH of 3.5 or the like, so as to be sufficiently acidic to exclude undesirable yeasts and bacteria, to contribute to the self-preservative character of the bread or other product, and to flavor the final barm bread. Rehydration with water at 43° C. is not essential, but is commonly used since it is known that baker's yeast with a moisture content of about 8% may be damaged by rehydration with cooler water. If this occurs, part of the yeast cell content leaks into the dough. This can be offset by the use of an emulsifying agent such as the lecithin described herein which offers protection against the leaching of the yeast cell content during rehydration.

It should be noticed that the acids supplied by the aqueous paste of the barm are generally absent from the dried product. These acids must be regenerated as a result of the propagation of the lactic acid producing bacteria, and this requires time on the order of 12–24 hours. Thus a dried barm will most likely always be used in a different manner to dried baker's yeast.

Preparation of a Bread from Rehydrated Dried Barm

The rehydrated dried barm is really for use in breadmaking, equivalent to a sample of whose grain barm, about 24 hours after mixing with water. In this form it can be used directly to make a bread dough or preferably further refreshed to make a larger supply of refreshed barm. A final bread dough can be made by fixing the rehydrated barm with whole grain flour containing some sprouted grains or malted grain flour, in an amount that is approximately two times the amount of the rehydrated or refreshed barm, and enough water to produce a bread dough. Salt, to taste, is dissolved in the water before it is added to make the dough. A wide variety of breads can be made from this basic dough by adding or substituting such ingredients as milk, olive oil, eggs, dried fruit, or the like. In order to make the dough into a bread the ingredients are first well blended together and the dough produced is left to rise, until almost doubled in volume due to the carbon dioxide produced by the yeast, for 2–8 hours according to the ambient temperature. At this time the dough can be kneaded well, until the dough can be stretched into a paper thin sheet, divided, bouled and left again to approximately double in volume. After this the boules can be shaped into loaves, left to rise so that they are only partially risen and still have residual rising power in the oven, slashed and finally baked at approximately 220° C. for 25–35 minutes according to the loaf size. Experienced bakers would be able to vary these conditions according to their needs and the type of flour being used.

The present invention will be further described with reference being made to the following examples. These examples are provided for illustrative purposes only and are not to be construed as limiting the scope of this invention which is, instead, as set forth by the appended claims.

EXAMPLE 1

A sample of whole wheat barm paste containing approximately 46% water, 54% whole wheat flour and approximately $10^7$ live yeast cells (*S. dairensis*, ATCC 20782) and $10^9$ live bacteria (*L. brevis*, ATCC 53295) per gram of barm paste was prepared using the methodology described in U.S. Pat. No. 4,666,719. The whole wheat berries used to prepare sprouted wheat, malted wheat and whole wheat flour were grown and stored without pesticidal treatment either chemical or physical; the whole wheat berries were nevertheless clean and undamaged.

A 56 g portion of this whole wheat barm paste starter was mixed with 14 g whole wheat flour (approximately 12% water) and 14 g malted wheat flour. The latter was produced by sprouting whole wheat, drying it, and grinding it to a flour. In addition 7 g soybean oil containing approximately 66% lecithin and 1000 ppm mixed tocopherols and 56 g water were added, so giving a mixture with a water content of 58% and 11% soybean oil as a percent of dry matter. These were well mixed and allowed to ferment for approximately 21 hours at ambient room temperature. The mixture was stirred at 4–8 hour intervals during this time.

To the above mixture, were added a further 28 g each of whole wheat flour and malted wheat flour, 14 g soybean lecithin and 28 g water, giving a mixture with a water content of 49% and 17% soybean oil as a percentage of the dry matter. This mixture was allowed to ferment for 23 hours at ambient room temperature. It was well mixed every 4–8 hours during the fermentation.

A third stage of refreshment and water content reduction consisted of adding 56 g portions of whole wheat and malted wheat flour, 28 g soybean oil and 38 g water, giving a mixture with a water content of 40% and a soybean oil content of 19% calculated as a percentage of dry matter in the mixture. Fermentation was allowed to proceed for 26 hours and the mixture was stirred every 4–8 hours.

For the fourth refreshment and water reduction, 56 g portions each of whole wheat flour and malted wheat flour were added, giving a mixture containing 34% water and 14% soybean oil (as % dry matter). Fermentation was allowed to proceed for 21 hours and the mixture was stirred at intervals of 4–8 hours.

Since the fourth refreshment and drying step did not produce a mixture with 30% or less water content a further drying and refreshment step was carried out by adding 112 g each of whole wheat flour and malted wheat flour. Mixing was achieved in a few seconds in a food processor fitted with a mixing blade. The product was a coarse granular form of the partially dried barm containing 28% water and 9% soybean oil, corresponding to 6% lecithin and 90 ppm mixed tocopherols, calculated on a dry matter basis. These granules were left at ambient room temperature to ferment for 28 hours before the final drying stage.

The final drying to 7–8% moisture was achieved using a food dryer that produced a draft of air at about 65° C. This heated air was first passed over a desiccating agent ($CaSO_4$) and then over the granules of partially dried barm (28% moisture). The temperature of the granules rose progressively from room temperature until at 38–40° C. all but 7–8% of the moisture had been driven off the barm. The maximum temperature that the granules were allowed to reach was 40° C. and the drying process was stopped when the temperature reached 38° C. Once the granules had cooled to room temperature they were vacuum sealed in plastic bags. The samples were stored at ambient room temperature (15–27° C.) and the dried barm was tested for its ability to gas and acidify dough after 4, 11, 16 and 33 days.

The dried barm was tested as follows after 4 days: 28 g dried barm was mixed with 28 g water at 43° C. The mixture was very bubbly and had a pH 3.5 within 24 hours of mixing and leaving covered at ambient room temperature (18–24° C.). No loaves were made in this test. After 11, 16 and 33 days the dried barm behaved in essentially the same way and a satisfactory loaf was produced in each case.

For comparative purposes after 33 days a sample of three times refreshed barm paste starter was made into exactly the same weight loaf using an identical process to that used for the loaf made from the refreshed dried barm. The resulting loaves were indistinguishable in size shape and texture. However, the loaf made from the dried barm had a mild malt flavor and had a deeper brown crust due to the malt and soybean oil supplied by the dried barm.

EXAMPLE 2

A sample of dried whole wheat barm containing malted wheat and soybean oil was prepared in a similar manner to that described in Example 1. The water content of the dried barm was 7%.

After 10 months' storage at ambient room temperatures, 18–24° C., a 28 g portion of this is dried whole wheat barm was rehydrated by mixing it well with 28 g water at 18° C. and then keeping it at approximately 32° C. for 24 hours. At the end of this time, the pH of the barm was 3.5 as measured by colored pH-indicating paper, and it was slightly gassed. At this time the rehydrated barm was refreshed by adding 28 g whole wheat flour containing approximately 0.8% malted wheat flour and 28 g water. In order to prepare more of the barm for breadmaking, it was refreshed again after a further 24 hour period, by which time the barm was very well gassed, and a third time after 18 hours more. The proportions of barm:flour:water used for each refreshment were 2:1:1 by weight and in each case the flour used was whole wheat flour containing approximately 0.8% malted wheat flour. Seven hours after the last refreshment, bread was made by mixing 224 g of this refreshed barm with 224 g water containing 4 g salt, 7 g olive oil, 10 g honey and 448 g freshly ground whole wheat flour, in an automatic breadmaking machine, which was set to produce a completed loaf in 4 hours. The bread produced was as well risen, good-textured and good-flavored as breads made from this barm before it had been subjected to drying.

EXAMPLE 3

A sample of whole rye barm paste starter containing approximately 52% water, 48% whole rye flour and approximately $10^7$ live yeast cells (*S. dairensis*) and $10^9$ live *Lactobacillus* bacteria per gram of barm paste was prepared using the methodology described in U.S. Pat. No. 4,666,719. The whole rye berries used to prepare sprouted rye, malted rye and whole rye flour were grown and stored without pesticidal treatment, either chemical or physical; the rye berries were nevertheless clean and undamaged.

A 56 g portion of this whole rye barm paste starter was refreshed by mixing it with 28 g whole rye flour, with a moisture content of approximately 12% and 56 g water, so giving a mixture which was a batter with a water content of 63%. These were well mixed together and left to ferment at ambient room temperature for 12 hours.

The rye barm was further refreshed with little reduction in the water content by mixing a 56 g portion of this once refreshed barm with 28 g whole grain rye flour and 28 g water. A slightly thicker batter was produced with a water content of 60%. The well mixed batter was allowed to ferment at ambient room temperature for 12 hours.

The above mixture was refreshed again and simultaneously reduced in water content to 52%, by mixing it with 56 g whole rye flour and 28 g water. This mixture, which had the consistency of a soft dough, was left to ferment for 12 hours at ambient room temperature.

Further refreshment and reduction in water content to 39%, were achieved by mixing in 98 g whole rye flour using a food processor fitted with a rotating blade. After about 10 seconds of mixing the product was in the form of coarse granules. These were left at ambient room temperature to ferment for 12 hours before further reducing the water content.

In order to reduce the water content still further and to refresh the partially dried barm produced thus far, 140 g whole rye flour was mixed in, again using a food processor fitted with a rotating blade. The product was in the form of finer granules and the water content had been reduced to 30%. Once again the refreshed, partially dried barm was allowed to ferment at ambient room temperatures for about 12 hours before proceeding.

About 3 hours before the final drying process, 84 g whole rye flour were mixed in, using a food processor fitted with a rotating blade. In this way the water content was reduced to 27%, the granules of product were still finer and there was a fresh supply of nutrients available for the microorganisms during the final drying and for the subsequent rehydration step.

The final drying to about 8% moisture was achieved using a food dryer that produced a draft of air at about 65° C. This air was first passed over a desiccating agent ($CaSO_4$) and then over the granules of partially dried barm (27% moisture). The temperature of the granules rose progressively from room temperature until at 36–40° C. all but 8–10% of the remaining moisture had been driven off the barm. The drying process was stopped after 3.75 hours when the temperature had risen to 37° C. The granules were allowed to cool to room temperature before they were packaged under vacuum in plastic bags. The samples were stored at ambient room temperature (15–27° C.).

A sample of this dried whole rye barm was evaluated about 7 hours after packaging. A 28 g portion of the dried whole rye barm was mixed with 28 g water at 43° C. and was left to ferment for 24 hours at ambient room temperature. By the end of this time it was well gassed and had risen; it was distinctly acidic (pH 4). In order to produce a somewhat mature barm and to prepare enough to make a loaf, the rehydrated barm was refreshed three more times at 12 hour intervals. For the first of these refreshments 28 g whole rye flour and 56 g water were added. After this refreshment the barm was very well risen and had a pH of 3.5: For the second refreshment 56 g whole rye flour and 70 g water were added. For the third refreshment, 112 g whole rye flour were added and only 101 g water were added so that the water content of this refreshed barm would be comparable with a particular sample of barm starter paste.

A 112 g portion of the refreshed whole rye barm, produced from the dried barm, was made into a loaf, by mixing it with 112 g water containing 2 g dissolved salt and 196 g whole rye flour. The dough produced was left to rise for 2 hours, was well mixed again and was then pressed into a nonstick coated loaf pan. The loaf was allowed to rise for a further 2.5 hours and was baked at 220° C. for 25 minutes. For comparison a second loaf was prepared using a freshly prepared whole rye barm paste that had not been through a drying process, but that did have a comparable water content to that of the refreshed barm produced from the dried sample. An identical recipe was used to prepare this second loaf. Both loaves were essentially the same in flavor, texture and appearance.

EXAMPLE 4

A sample of whole wheat barm which had been stored at 4° C., containing approximately 55% water, 45% freshly ground whole wheat flour with 0.8% malted wheat flour, approximately $10^7$ live yeast cells (*S. dairensis*) and $10^9$ live bacteria (*L. brevis*) per gram was prepared using the method described under U.S. Pat. No. 4,666,719. The whole wheat berries used to prepare sprouted wheat, malted wheat and whole wheat flour were grown and stored without pesticidal treatment, either chemical or physical; the whole wheat berries were nevertheless clean and undamaged.

Before being used to produce a dried barm sample, this barm was refreshed five times at 10 to 29-hour intervals, such that the ratio of barm:water:freshly ground whole wheat flour with 0.8% malted wheat flour was always 2:1:1 by weight.

Approximately 5 hours after the last refreshment of this barm sample, a 448 g portion was mixed with 112 g of freshly ground whole wheat flour with 0.8% malted wheat flour to form a dough. The water content of this dough was approximately 46%.

The dough was held at an ambient temperature of about 21° C. for 4 hours before being mixed with 560 g freshly ground whole wheat flour with 0.8% malted wheat flour using a food processor with a rotating blade mixer. The mixture was produced in the form of granules. The water content of these granules was about 29%. The granules were immediately spread out in the dryer in a layer 1–2 cm thick and dried with air at 39° C. for approximately 16 hours. The final water content of the dried barm was 8.5%.

The dried barm so produced was sealed under air in plastic pouches possessing low moisture and oxygen transmission properties.

A 28 g portion of this dried barm which had been stored at ambient room temperatures (approximately 18° C.) for 5 weeks was rehydrated by mixing it with 28 g water at 18° C. This mixture was held at approximately 35° C. for 24 hours; it was stirred once after 12 hours. At the end of this 24 hour period the pH had fallen to 3.5, according to a test with pH-indicating paper and it was very well gassed.

The 56 g portion of barm so produced was refreshed, at the end of the 24 hour rehydration period, a second time after a further 24 hours, and a third time after 12 more hours. The proportions of barm:water:freshly ground whole wheat flour with 0.8% malted wheat flour used for each refreshment were 2:1:1 by weight. The barm was held at an ambient room temperature of approximately 18° C. during the refreshment.

In order to prepare a bread sample from this refreshed barm, 5 hours after the last refreshment, a 224 g portion of the barm was mixed with 224 g water containing 4 g salt, 7 g olive oil, 10 g honey and 448 g freshly ground whole wheat flour with 0.8% malted wheat flour, in an automatic home breadmaking machine set to produce a completed loaf after 4 hours. The resultant bread had the flavor, texture and loaf size essentially identical to loaves produced from barm samples that had not been subjected to drying.

EXAMPLE 5

A leavening barm was prepared from whole durum wheat flour (approximately 8% moisture), sprouted durum wheat berries, and water using the method described in U.S. Pat. No. 4,666,719. The whole durum wheat berries used to prepare sprouted durum wheat, malted durum wheat, and whole durum wheat flour were grown and stored without pesticidal treatment, either chemical or physical; these whole wheat berries were nevertheless clean and undamaged. The mature barm had a pH of 3.5 and leavening properties such that raised breads could be prepared with it. Because of these observations, it was assumed that the barm contained a *Saccharomyces* yeast which raised the bread and that it was of the kind that would allow the full growth of *Lactobacillus* bacteria which could, in turn, acidify the barm enough to bring the pH down to 3.5.

The barm was refreshed five times at ambient room temperatures at 8-24 hour intervals, with whole durum wheat flour and water such that the proportions of barm:whole durum wheat flour:water, by weight, were 2:1:1, before being used to prepare a dried sample of the barm.

A 112 g portion of refreshed durum wheat barm containing approximately 54% water and 46% whole durum wheat flour was held at ambient room temperature for a total of 24 hours since its last refreshment; it was stirred well at 8-12 hour intervals. The water content of the barm was then reduced to about 47% by the addition of 56 g whole durum wheat flour and 28 g water. The soft dough produced was stirred well, covered and left to ferment for 9 hours at ambient room temperature. A further 98 g whole durum wheat flour water mixed into the soft dough and the product was granulated by using a food processor with a rotating blade mixer; the granules were coarse due to the relatively high moisture content, as yet, of 34%. The granules of barm were allowed to ferment at ambient room temperature for 7 hours more before adding 140 g whole durum wheat flour with the aid of a food processor as before; finer granules were produced and the moisture content was estimated to be 26%. Eight hours later 84 g whole durum wheat flour was mixed into the partially dried barm using the food processor, as before, to give a partially dried barm with an estimated water content of 23%. After a further 3 hours the barm was finally dried in a stream of dried air at about 65° C. The drying process was stopped when the air leaving the drier reached 38° C., after about 3.5 hours. The dried barm, so produced, was packaged under vacuum in plastic pouches and stored at cool ambient room temperature, approximately 18° C.

A 28 g portion of the dried durum wheat barm, which had been stored as described above for six months, was rehydrated by mixing it well with 28 g of water at 18° C. and then leaving it covered, at about 32° C. for 24 hours. At the end of this time the mixture was very well gassed and had a pH of 3.5 as measured by pH-indicating paper. The rehydrated barm was refreshed at the end of the rehydration time and twice more after a further 23 and 19 hours; the proportions of barm:flour:water were always 2:1:1, by weight. The flour was whole durum wheat flour containing about 0.8% malted durum wheat flour. Bread was made 7 hours after the last refreshment of the barm. A 224 g portion of the refreshed barm was mixed with 224 g water containing 4 g salt, and 448 g whole durum flour containing about 0.8% malted durum wheat flour, 7 g olive oil and 10 g honey. The dough was mixed and then left at approximately 32° C. for 45 minutes before kneading. The kneaded dough was divided and immediately placed in pans and left to rise for 2 hours more, by which time the dough had almost doubled in volume. The loaves were baked at 232° C. for 20 minutes. The flavor texture and volume of the loaves were all similar in every way to those prepared from the original barm before it had been dried.

What is claimed:

1. A dried form of a leavening barm comprising viable cells of a maltose-fermenting *Lactobacillus*, viable cells of a non-maltose-fermenting *Saccharomyces*, whole grain flour, nonvolatile fermentation products and 5-12% water.

2. The dried leavening barm of claim 1 wherein said whole grain flour is whole wheat flour.

3. The dried leavening barm of claim 1 wherein said whole grain flour is whole rye flour.

4. The dried leavening barm of claim 1 additionally comprising an emulsifying agent.

5. The dried leavening barm of claim 1 additionally comprising an antioxidant.

6. The dried leavening barm of claim 1 additionally containing soybean oil providing lecithin emulsifier and tocopherol antioxidant.

7. The dried leavening barm of claim 2 additionally comprising malted whole grain flour.

8. The dried leavening barm of claim 7 wherein said malted whole grain flour is diastatic malted whole wheat flour.

9. The dried leavening barm of claim 3 additionally comprising malted whole rye flour.

10. The dried leavening barm of claim 1 wherein the *Lactobacillus* is *Lactobacillus brevis*.

11. The dried leavening barm of claim 6 wherein the *Lactobacillus* is *Lactobacillus brevis*.

12. The dried leavening barm of claim 1, wherein the *Saccharomyces* is *Saccharomyces dairensis*.

13. The dried leavening barm of claim 6 wherein the *Saccharomyces* is *Saccharomyces dairensis*.

14. The dried leavening barm of claim 10 wherein the *Saccharomyces* is *Saccharomyces dairensis*.

15. The dried barm product of claim 14 wherein the *Lactobacillus brevis* is *Lactobacillus brevis* atypical ATCC 53295 and the *Saccharomyces dairensis* is ATCC 20782.

16. A process for producing a dried barm leavening agent containing viable yeast cells and viable bacteria cells comprising the steps of
   a. obtaining an aqueous based whole grain barm containing a non-maltose-fermenting *Saccharomyces* yast and a maltose-fermenting *Lactobacillus* bacteria and having a water content of from about 45 to about 60%;
   b. gradually adding whole grain flour to said barm under conditions which permit propagation of the yeast and bacteria and generation of nonvolatile fermentation products, until a low water product containing whole grain flour and having a water content of from about 20–35% is achieved; and
   c. drying the low water product with warm dry air to a moisture content of about 5–12%.

17. The process of claim 16 wherein the low water product is granulated.

18. The process of claim 16 wherein the barm of step a is propagated in the presence of added whole grain flour and a water content of greater than 50% prior to carrying out step b.

19. The process of claim 16 wherein in step b the whole grain flour is added continuously at a rate which permits the bacteria and yeast to be propagated during the addition, in order to maintain the concentration of such microorganisms.

20. The process of claim 16 wherein in step b the whole grain flour is added in portions, said portions being spaced so as to permit the bacteria and yeast to be propagated and to maintain the concentrations of these microorganisms.

21. The process of claim 20 wherein the flour is added in 2 to 5 portions.

22. The process of claim 16 wherein the warm dry air has a temperature of 65° C. or below.

23. The process of claim 16 wherein the *Saccharomyces* is *Saccharomyces dairensis*.

24. The process of claim 16 wherein the *Lactobacillus* is *Lactobacillus brevis*.

25. The process of claim 23 wherein the *Lactobacillus* is *Lactobacillus brevis*.

26. The process of claim 25 wherein the *Lactobacillus brevis* is *Lactobacillus brevis* atypical ATCC 53295 and the *Saccharomyces dairensis* is ATCC 20782.

* * * * *

UNITED STATES PATENT AND TRADEMARK OFFICE
CERTIFICATE OF CORRECTION

PATENT NO. : 4,950,489

DATED : August 21, 1990

INVENTOR(S) : Monica A. Spiller

It is certified that error appears in the above-identified patent and that said Letters Patent is hereby corrected as shown below:

Title page:
In the abstract, line 2, replace "maltosa" with -- maltose --.

In column 10, line 44, replace "really" with -- ready --.

In column 10, line 45, replace "whose" with -- whole --.

In column 10, line 50, replace "fixing" with -- mixing --.

In column 12, line 44, delete the word "is".

In column 17, line 12, replace the word "yast" with -- yeast --.

Signed and Sealed this

Third Day of March, 1992

Attest:

HARRY F. MANBECK, JR.

Attesting Officer

Commissioner of Patents and Trademarks